July 2, 1929.  A. F. GODEFROY  1,719,761
MOTOR
Filed Feb. 23, 1927  3 Sheets-Sheet 3

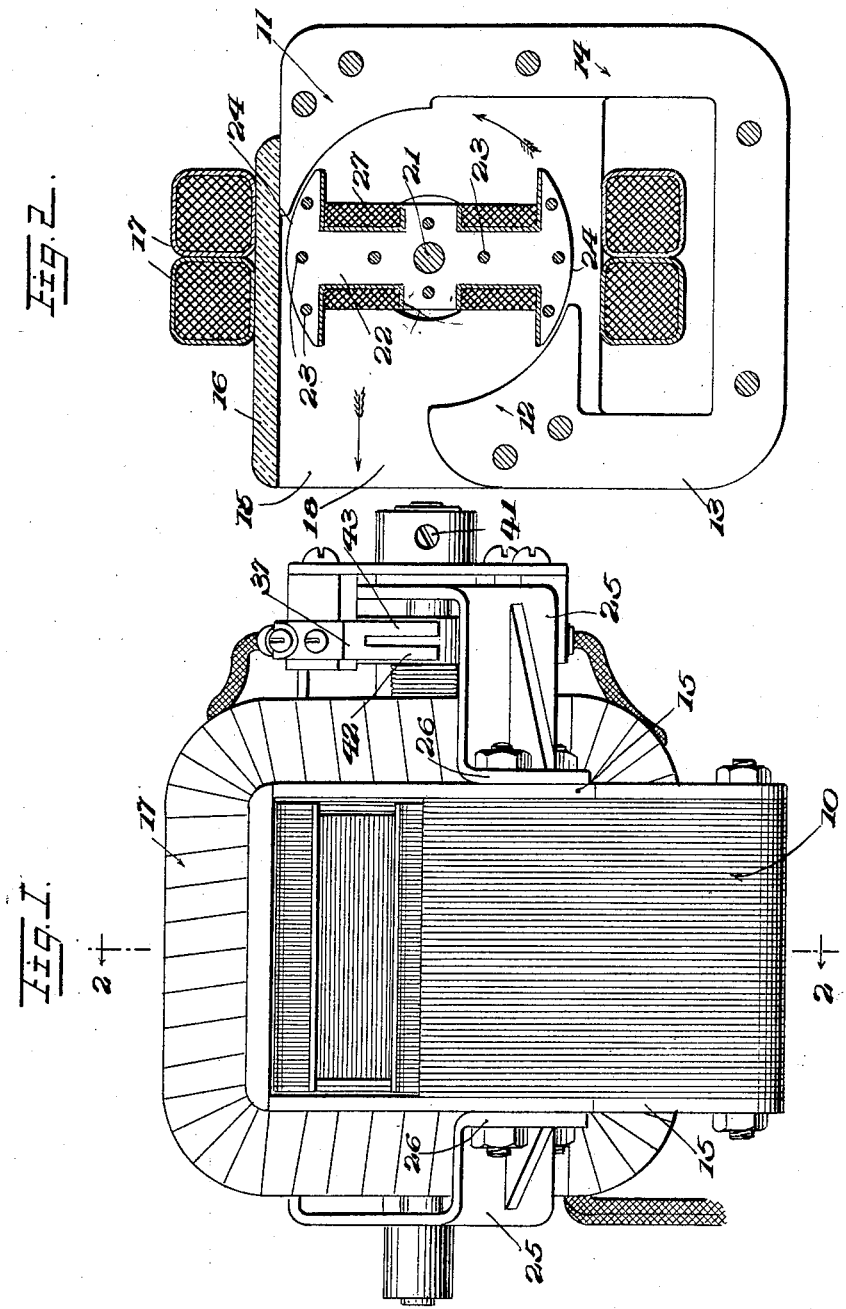

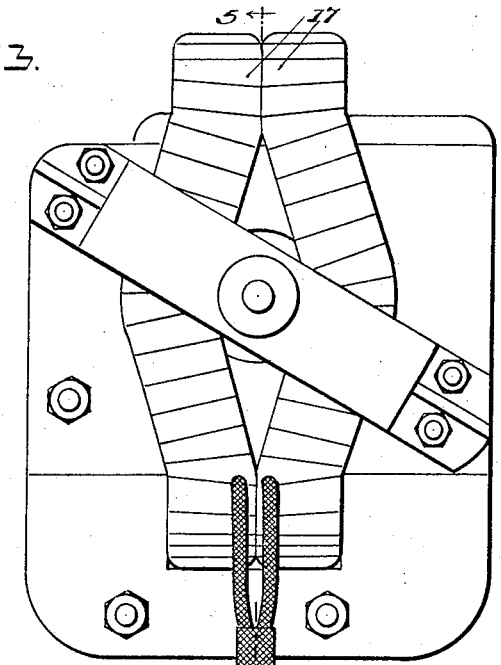
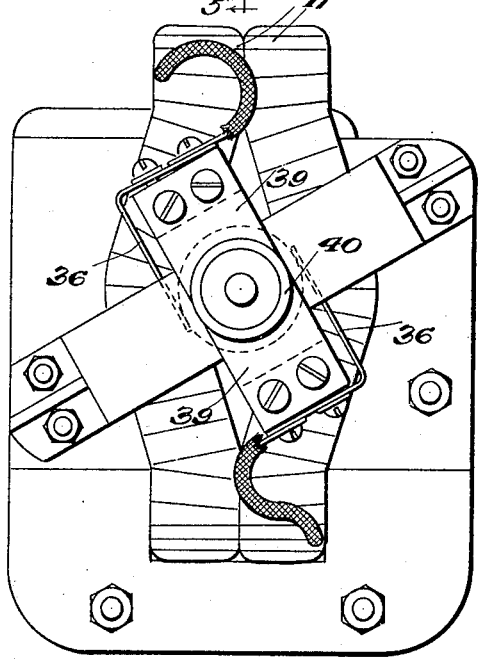

WITNESSES:

INVENTOR
Alexandre F. Godefroy.
BY
ATTORNEYS

Patented July 2, 1929.

1,719,761

UNITED STATES PATENT OFFICE.

ALEXANDRE F. GODEFROY, OF MEXICO, MEXICO.

MOTOR.

Application filed February 23, 1927. Serial No. 170,326.

This invention relates to improvements in electric motors.

More particularly the invention relates to improvements in electric motors of the solenoid type, and has for the general object to provide a construction of motor of the type in which relatively high rotational speed and operating efficiency may be obtained.

It is also an object of the invention to provide an electric motor of the type above characterized which may be operated by either alternating current or direct current.

It is a further object of the invention to provide a motor of the type referred to in which the rotatable element will serve to cool the motor.

Other objects relating to details of construction combination and arrangement of parts will hereinafter appear in the detail description to follow.

The invention is illustrated by way of example in the accompanying drawings, in which:—

Figure 5:
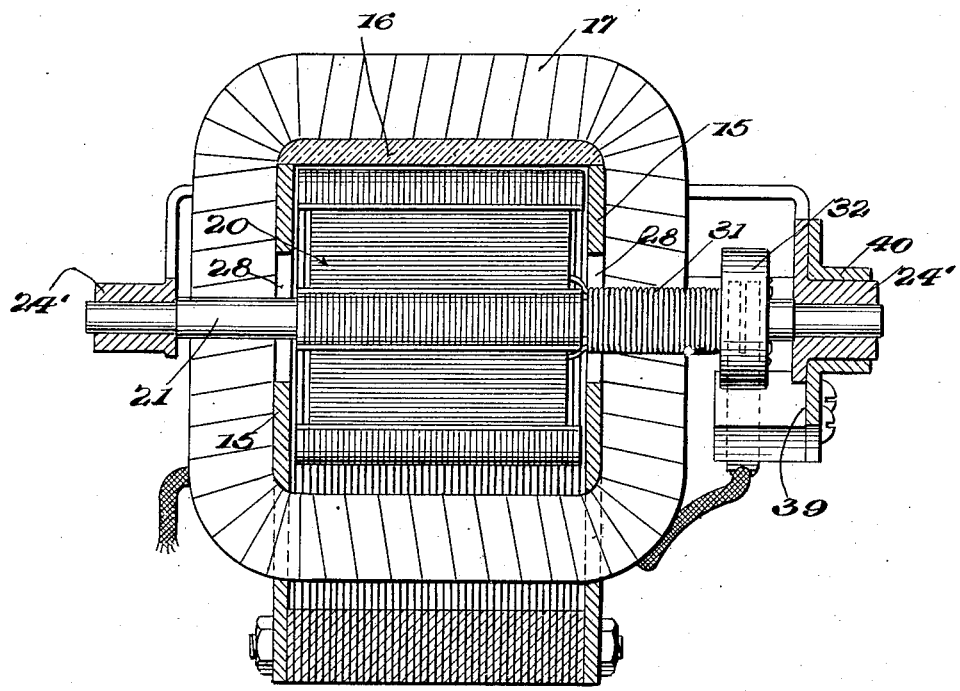
Figure 6:
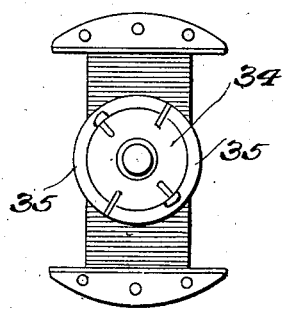

Figure 1 is a view in side elevation of a motor constructed in accordance with the present invention, Figure 2 is a transverse sectional view taken substantially on the line 2—2 of Figure 1, Figures 3 and 4 are opposite ends of the motor, Figure 5 is a longitudinal sectional view taken substantially on the line 5—5 of Figure 3, and Figure 6 is an end elevation of the armature.

In carrying out my invention I employ an enclosure in the form of a casing including a laminated magnetic core about which there is supported suitable coils to form a solenoid. Between the poles of the solenoid there is rotatably supported an armature or blade which is provided with a winding. The armature is provided with a commutator and the solenoid coils are preferably connected in series with the armature coil. The arrangement of the armature poles and solenoid poles and coils produce a relatively high rotational speed of the armature. The armature draws air through suitable openings of the casing and expels the same through air outlet provided for such purpose in the casing and thus cools the motor.

Referring to the drawings more particularly, 10 indicates generally a laminated core which provides two spaced poles 11 and 12. The core is substantially U-shaped in configuration with the exception that the leg 13 is of less length than the leg 14 and thereby providing the angular disposal of the poles 11 and 12 as shown to advantage in Figure 2.

The sides of the core 10 are closed by plates 15 which are secured to the core by suitable bolts which also serve to bind together the laminal constituting the core 10. There is further provided a top plate 16 which is of non-magnetic material and serves to complete the enclosure formed by the core 10 as well as provides a supporting plate for the solenoid coils 17. The enclosure formed by the core 10, side plate 15 and plate 16 has an air outlet or opening 18.

Within the motor casing 2 there is rotatably mounted an armature or blade generally designated by reference character 20 which as best shown in Figure 2, which comprises a shaft 21 upon which is mounted a laminated core 22. The laminal constituting core 22 are secured together by bolts 23 and the core as a whole is substantially I-shaped as shown. The armature ends or pole faces 24 are preferably arcuate in shape.

It will be noted the solenoid coils 17 extend through suitable openings in the side plates 15, side plate 15 being made into sections in order to permit the coils to be positioned. This construction is essential in order to obtain the desired disposal of coils 17 as best shown in Figure 2.

The ends of shaft 21 are journaled in suitable bearings 24' carried by U-shaped bracket members 25 and said brackets having their ends formed with suitable extensions or feet 26 which are bolted to the core 10.

The armature core 22 has a winding 27 arranged thereon which may constitute enameled wire suitable for withstanding considerable heating. Also it may be here mentioned that both the solenoid coils 17 and the armature winding 27 may be asbestos covered wire in order to withstand heating of the winding. This armature winding may be energized for the purpose of heating the same and thus heat the air blown from the motor. The motor will operate without energizing the armature coil.

At the point the shaft 21 passes through the end plates 15 large circular openings 28 are provided to permit air to be drawn within the motor casing for cooling the motor or to permit a large volume of air to be heated by the armature winding 27 and expelled through opening 18.

The armature winding 27 has its terminal end portions extended along an end of shaft 21 and preferably these terminal portions of the coil are wrapped with tape as at 31 in Figure 5. The shaft 21 carries a commutator 32 preferably comprising a suitable insulator plate or disc 34 carrying two insulated commutator segments 35 to be engaged by a pair of brushes 36, said brushes being supported by extension 38 carried by radially extending plates 39 formed integrally with a ring 40 fitted upon a bearing 24'. The ring 40 may be provided with a set screw 41 to adjustably secure the same against rotation upon bearing 24. Preferably each brush 36 is split to provide the two fingers 42 and 43. Finger 43 in each case is made slightly longer than finger 42 whereby the armature winding will be shorted each time the longer finger of the commutator brushes pass from one commutator segment to the other.

It will be noted the solenoid coils 17 are spread apart at the points the shaft 21 passes therebetween. This spreading of the coils 17 allows air to freely enter the openings 28 of the motor casing.

As before stated the solenoid coils are connected in series with the armature coil as shown in the drawings and the normal current for operating the motor would heat the armature coil to a considerable extent. In operating the motor heretofore described, the brushes 36 are shifted so that reversal of current in the solenoid coils 17 takes place when the blade or armature lies in the position shown in Figure 2, the poles thereof are each being repelled by the poles of the core 10. When the armature is at right angles to the position in Figure 2, the same is being attracted by the pole pieces 11 and 12. The armature never finds a neutral position, the same is continually being urged in a direction of the arrows shown in Figure 2. This is brought about by the disposal of the coils 17 with respect to the poles of the core 10. In using the coil 27 the same becomes heated. The air drawn through the openings 28 circulates about the armature winding 27 is heated and expelled through openings 18. By arrangement of the brushes 36 in the manner previously described, excessive sparking is eliminated. The motor operates to heat and blow air by the same current. The operation of the motor therefore may have two functions.

While I have shown and described the preferred form of my invention I wish it to be understood that I am well aware of the fact that changes might be made by those skilled in the art without departing from the spirit of my invention as described by the appended claims.

I claim:—

1. In an electric motor, a casing, field windings carried by said casing, an armature shaft extending through air outlet openings formed in opposite walls of said casing, and a blade-like armature structure mounted on said shaft within said casing and acting to draw air inwardly of the said inlet openings, and to discharge the same outwardly of an outlet opening formed in an angularly disposed wall of the casing.

2. In an electric motor, a casing, field windings carried exteriorly of said casing and having portions thereof disposed within the same, an armature shaft extending through air inlet openings formed in opposite walls of said casing, and a blade-like armature mounted on said shaft within said casing and acting to draw air inwardly of the said inlet openings and to discharge the same outwardly of an outlet opening formed in an angularly disposed wall of the casing.

3. In an electric motor, a casing, an armature shaft extending through the casing and having its opposite ends projecting outwardly of air inlet openings formed in the walls of said casing, field windings carried exteriorly of said casing having portions of the same disposed within the casing, portions of adjacent coils of said field windings being spaced to either side of the adjacent ends of said armature shaft and in line with said air inlet opening, and a blade-like armature carried by said armature shaft and acting to draw air inwardly of said inlet openings and to discharge the same outwardly of an outlet opening formed in a wall of said casing at right angles to the walls having the inlet openings therein.

4. In an electric motor, a casing, an armature shaft extending through the casing and having its opposite ends projecting outwardly of air inlet openings formed in the walls of said casing, field windings carried exteriorly of said casing and having portions of the same disposed within the casing, portions of adjacent coils of said field windings being spaced to either side of the adjacent ends of said armature shaft and in line with said air inlet openings, a blade-like armature carried by said armature shaft and acting to draw air inwardly of said inlet openings and to discharge the same outwardly of an outlet opening formed in a wall of said casing at right angles to the walls having the air inlet openings therein, and windings on said blade-like armature arranged in series with said field windings.

ALEXANDRE F. GODEFROY.